US012672612B2

(12) United States Patent　　　　(10) Patent No.:　US 12,672,612 B2
McCord et al.　　　　　　　　　　(45) Date of Patent:　　Jul. 7, 2026

---

(54) NARROWBAND PHOTOSYNTHETICALLY ACTIVE RADIATION ("PAR") SUBSTANTIALLY ONLY AT EACH OF MULTIPLE EMISSION WAVELENGTHS YIELDS GOOD PHOTOSYNTHESIS AT REDUCED ENERGY COST

(71) Applicant: Symbiotic Systems, Inc., San Diego, CA (US)

(72) Inventors: Matthew McCord, San Diego, CA (US); Paul Bhola, San Diego, CA (US)

(73) Assignee: SYMBIOTIC SYSTEMS, INC., San Diego, CA (US)

( * ) Notice: Subject to any disclaimer, the term of this patent is extended or adjusted under 35 U.S.C. 154(b) by 227 days.

(21) Appl. No.: 16/602,837

(22) Filed: Dec. 10, 2019

(65) Prior Publication Data

US 2022/0361416 A1　　Nov. 17, 2022
US 2024/0381814 A9　　Nov. 21, 2024

Related U.S. Application Data

(62) Division of application No. 13/573,960, filed on Oct. 15, 2012, now Pat. No. 10,602,669.

(51) Int. Cl.
*A01G 7/04*　　　　(2006.01)
(52) U.S. Cl.
CPC ..................................... *A01G 7/045* (2013.01)
(58) Field of Classification Search
CPC .......... A01G 7/045; A01G 9/249; A01G 9/20; A01G 9/26; A01G 7/04; G02B 6/0073; G02B 6/0068; F21K 9/00
See application file for complete search history.

(56) References Cited

U.S. PATENT DOCUMENTS

2018/0007838 A1 * 1/2018 McCord ................. H05B 45/20
2020/0093072 A1 * 3/2020 Pickett ................... A01G 9/249
(Continued)

FOREIGN PATENT DOCUMENTS

WO　WO-2021009144 A1 * 1/2021 ............... A01G 9/14
WO　WO-2021119363 A2 * 6/2021 ............. A01G 7/045
(Continued)

*Primary Examiner* — Trinh T Nguyen
(74) *Attorney, Agent, or Firm* — Kenealy Vaidya LLP

(57) ABSTRACT

Produced PAR neither replicates the spectral bandwidth of sunlight at the surface of the earth, nor the absorption spectrum of green plants, nor the absorption spectrum of photosynthetic processes, but—based on discovery that PAR at only a number of unique wavelengths is optimally energy-efficient to promote normal or better plant growth—instead desirably concentrates PAR emissions in a limited number, preferably about nine (9), narrow bands. Narrowband, even extremely narrowband, radiation is preferred at 430 and 662 nanometers wavelength (first and second absorption peaks of chlorophyll A); 453 and 642 nanometers wavelength (first and second absorption peaks of chlorophyll B); and still other wavelengths (only). Preferably more than 50% of the total PAR flux is within a total bandwidth of less than 160 nanometers wavelength in the range between 360 and 760 nanometers wavelength, and more preferably 90% of the PAR flux is within a total bandwidth of less than 80 nanometers wavelength within this range. When the intensity of the PAR flux in these narrow bands is, as is preferred, only but that occurring within the normal solar spectrum, then tremendous energy savings are innately realized in production of the new-spectrum PAR, ranging to ¾ and more from previous PAR. Moreover, the new-spectrum multi-narrow-band PAR is electrically efficiently produced using narrowband-emission LEDs.

13 Claims, 5 Drawing Sheets

(56)             References Cited

U.S. PATENT DOCUMENTS

| | | | | |
|---|---|---|---|---|
| 2020/0184153 A1* | 6/2020 | Bongartz | ................. | A01G 9/24 |
| 2021/0259158 A1* | 8/2021 | Ashdown | ............... | A01G 7/045 |
| 2022/0400622 A1* | 12/2022 | McCord | ................. | A01G 7/045 |

FOREIGN PATENT DOCUMENTS

| | | | | | | |
|---|---|---|---|---|---|---|
| WO | WO-2021262010 | A1 | * | 12/2021 | | |
| WO | WO-2022165392 | A1 | * | 8/2022 | ............ | A01G 7/045 |
| WO | WO-2023023542 | A1 | * | 2/2023 | | |

* cited by examiner

NARROWBAND PHOTOSYNTHETICALLY ACTIVE RADIATION ("PAR") SUBSTANTIALLY ONLY AT EACH OF MULTIPLE EMISSION WAVELENGTHS YIELDS GOOD PHOTOSYNTHESIS AT REDUCED ENERGY COST

REFERENCE TO RELATED PATENT APPLICATIONS

The present application is a divisional patent application of application Ser. No. 13/573,960 filed Oct. 15, 2012.

The present application is related to co-pending U.S. patent application Ser. No. 14/544,268 for "Multiple colors, and color palettes, of narrowband photosynthetically active radiation (PAR) time-staged over hours, days, and growing seasons yields superior plant growth", to the selfsame Matthew McCord who is a co-inventor of the present application.

BACKGROUND OF THE INVENTION

1. Field of the Invention

The present invention generally concerns the optimization of Photosynthetically Active Radiation ("PAR") which, if applied to plants, will speedily produce mature healthy plants at minimum energy cost.

The present invention particularly concerns a system wherein and whereby energy-efficient growth light(s) may be applied to plants.

2. Background of the Invention 2.1 Photosynthetically Active Radiation ("PAR")

In his treatise "SPECTRAL COMPOSITION OF LIGHT AND GROWING OF PLANTS IN CONTROLLED ENVIRONMENTS" appearing in International Lighting in Controlled Environments Workshop, T. W. Tibbitts (editor) 1994, Russian author Alexander A. Tikhomirov says: "I do not believe that we have to copy illumination of plants in natural conditions for use in controlled environment growing", giving the example of "there's no need to grow some species of plants under alternative light dark periods . . . [where] our research showed that productivity of some plants (radish, wheat) can be increased under continuous irradiation " (Citing Tikhomirov et al., 1976; Lisovsky et al., 1987).

Tikhomirov makes this statement after discussing (1) the photosynthetic rates of different plants, (2) differently aged plants, (3) different portions of plants, (4) plants of differing sensitivity to Photosynthetically Active Radiation ("PAR"), (i.e. cucumbers and sunflowers will not grow but under PAR of suitable intensity and frequency, whereas tomatoes and wheat are capable of producing a harvest irrespective of the PAR spectrum and intensity provided), for differing PAR irradiance.

But Tikhomirov, and all the learned authors he cites, and the entire field of composing light(s) of a certain spectral composition in order to realize optimal plant growth (in a controlled environment) does not seem to recognize certain truths uncovered by the inventors.

First, since the PAR spectrum of absorption for green leaved plants (on average), and for particular individual plants, are well known, it has been thought that the spectrum of PAR provided to a plant should be in accordance with the spectrum of irradiance which the plant absorbs. (It is recognized that this may vary over time with the age of the plant, and that the optimal PAR can be different for the top leaves of the plant and the under-leaves.) Since some plants can, to some degree, adopt to the PAR radiation that they receive, growing in a manner to use more of what spectrum and intensity of irradiance is available, what could be more logical than to supply the plant with PAR that matches its preferred absorption? And this is what the prior art teaches to do.

2.2 Use of Light Emitting Diodes (LEDs) as Growth Lights for Plants

Light Emitting Diodes, or LEDs, respond instantly when power is applied. A greater electrical force can be used if the electricity is pulsed at a very high rate rather than driving it with a steady current this is called the duty cycle of the LED. Pulsed LEDs can appear brighter to the human eye because the period of darkness changes to fast for us to see. Considering now the photosynthetic process takes less than one trillionth of a second you can establish any pulsing will and does affect growth. Most previous LED-based "grow lights" emit a constant and consistent stream of usable light.

Light Emitting Diodes (LEDs) have known advantages for use in greenhouses.

They produce (1) lower heat output, permitting proximity to plants, at (2) highly selectable wavelengths. They (3) offer lower cost of use, (4) longer life than incandescent lighting, (5) compact device size, and(6) flexible design options for horizontal or vertical lighting and for moving fixtures. They offer (7) potentially higher quantum efficiency.

2.3 Terminology

In this specification the term "wavelength" is used exclusively in description of the color of the generated and applied PAR: this "wavelength" then being, by the laws of physics, then number "1" over the "frequency" of the applied PAR. However, the word "frequency" is not used in description of the color of the applied PAR within this specification. In the specification of the present and related applications the word "frequency" is reserved for another purpose: namely, a relatively fast, kilohertz, rate at which the applied PAR is modulated. Although this absence of the word "frequency" in description of the applied PAR will not be of particular concern in the present specification, it's use (non-use) is consistent with the related patent application

SUMMARY OF THE INVENTION

The present and related inventions contemplate optimization of Photosynthetically Active Radiation ("PAR"), and the application of PAR so optimized to plants in order to speedily produce mature healthy plants at minimum energy cost.

Comparing this (1) optimized PAR to (2) the wavelength and energy spectrum of sunlight at the earth's surface, the present invention alone—and without synergistic combination with a related invention—can produce equivalent plant growth with less than $\frac{1}{3}$ the light illumination (photonic) flux over less than $\frac{1}{3}$ the spectrum using less than $\frac{1}{3}$ the energy (which is not exactly the same thing as flux, or intensity, of illumination, E=hv) that is within natural sunlight, and can likely so function at less than $\frac{1}{6}$ of these factors as are within natural sunlight.

Meanwhile a related invention to the same inventors that is contained within a related patent application also, and substantially independently of the present invention, realizes equivalent plant growth again using but $\frac{1}{3}$, and more likely but $\frac{1}{6}$, of these same factors as are within normal sunlight.

The most important factor in both the present and related inventions is energy: the present and related inventions each teach how to grow realize equivalent growth in plants by applying an artificial PAR that contains but a fraction of the energy of normal sunlight. Not only is the PAR of the present invention more energy efficient than is God's natural sunlight in engendering the growth of earth plants that have evolved to use such sunlight over millions of years, but it is so much more efficient to do so that it audaciously presents the possibility that may now be possible to (1) convert solar energy received upon the earth to electricity in solar cells, and then (2) use the electricity so generated to power high-efficiency grow lights producing PAR in accordance with the present invention, so as to, in accordance with the optimized plant growth environment of greenhouses, (3) derive greater, and better, plant growth than would have been possible using the natural sunlight!

1. The discovery of How Photosynthetically Active Radiation ("PAR") Should be Optimized The present and related inventions are based on the discovery that the optimum growth radiation for plants, or Photosynthetically Active Radiation ("PAR"), is not the substantial spectrum of the sun's radiation that is present upon the surface of the earth, nor even that portion of the solar spectrum including those colors that are visible to the human eye.

Neither is the optimal PAR the absorption spectrum of a green plant, particularly in the range from 400 nanometers to 700 nanometers. In particular, plants apparently absorb light at many wavelengths that they apparently cannot use, or at least do use but poorly, in photosynthesis—although many plants do do a good job of reflecting (and not absorbing) the color green, which color light is notorious as being of but little use to plants, and in the photosynthetic and other processes of plants.

Neither is the optimal PAR for a green plant growth simply some gross modification to its absorption spectrum, such as by (1) subduing or eliminating green illumination, and/or (2) boosting radiation in spectral regions known to be absorbed by plant processes such as, by way of example, in regions of the dual 430 nm and 662 nm peak light absorption regions for the chlorophyll A reaction, and/or the dual 453 nm and 642 nm peak light absorption regions for the chlorophyll B reaction.

Neither is the optimal PAR for plants some spectrum that replicates, preferably as closely as possible, the combined absorption spectrums of all, or at least most, of the molecules and the significant photosynthetic processes known to transpire in plants, particularly including the (1) chlorophyll A, (2) chlorophyll B, (3) beta carotene, (4) phycocyanin, and (5) the Emerson effect, reaction processes.

Instead, in accordance with the present invention it has been discovered that the most efficient application of PAR to plants—that PAR that, if applied, will be the most efficient in producing growth of the plant per unit energy of PAR illumination—is extremely comprised of but narrowband emissions located at but a nominal two "handfuls" of individual wavelengths—preferably some nine (9) or so wavelengths in total—within the entire PAR spectral range between 400 nm and 760 nm wavelength. The most preferred PAR of the present invention will be seen to pour (1) at least 50%, and more preferably 90%, of the total PAR (2) preferably into each of at least four and less than sixteen and most preferably nine, narrowband spectral regions (3) each region of preferably ±5 nm or less bandwidth about an associated center frequency, and more preferably even less bandwidth.

To say again, most preferably the apparatus, and the method, of the present invention will produce, will use, a PAR wherein some 90% of the total energy of the PAR exists in, and is applied in, but nine (9) spectral regions each of which is some ±5 nm or less in bandwidth about an associated center frequency—leaving an astounding some 360 nm−90 nm=270 nm of bandwidth between 400 nm and 760 nm in which regions the inventors do not believe, in general, that it is of any, or at least much, use to include any radiation whatsoever, the plants seemingly being unable to optimally effectively use radiation within this huge range of 270/360, or approximately ¾ths of the entire spectral range!

In fact, the inventors are of the opinion (but cannot positively verify due to present (circa 2012) challenges in the LED-based technology of efficiently producing grow lights emitting a number of strictly monochomatic wavelengths) that it is likely that some, or all, of the PAR radiation may be exclusively centered at one of a number of wavelengths—each emission being at a fixed wavelength of ±1 nm, or ±0.1 nm, or whatever. In other words, the plant not only does not care that each of a number of radiations it receives should each be at but a single wavelength—so long as all necessary radiation frequencies supportive of all necessary photosynthetic processes are received.

In still other words, if it is not sufficiently shocking that, as stated in the concluding sentence to the second previous paragraph, that plants do not optimally—optimally—effectively use solar radiation throughout ¾ths of the entire spectral range, if a fine point is put on the word "optimal" then it appears that plants can do without illumination at 90%+, or 99%+, or 99.9%+, or whatever of the normal solar spectral range (roughly from 400 nm to 760 nm). Although plants do not optimally use radiation throughout the entire spectral range of sunlight at the surface of the earth they do voraciously use, as explained, radiation at an absolute minimum of four (4), and more preferably at nine (9) wavelengths.

Now it is admittedly true that a plant can, per its absorption curves for various photosynthetic processes, seemingly make some use of radiation outside its peak absorption regions for each photosynthetic process. However the plant can apparently optimally process one photon after another at each of an exact same frequency at each of a number of "most efficient use" regions. For example, the inventors believe that plant processes involving chlorophyll A will function—likely with superior efficiency in use of light energy for growth—with PAR inputs at only 430 nm and 662 nm (both being required). Likewise, growth light input is seemingly optimized at, and only at, 453 nm and 642 nm (both being required) for processes involving chlorophyll B.

Natural sunlight at the earth's surface does not, of course, consist of but some four or nine, unique wavelengths. Furthermore, the inventors do not predict that plant life on earth would perish should the atmosphere suddenly become opaque to 430 nm±1 nm wavelength radiation because a plant can admittedly use radiation outside of this wavelength range. However, as discovered and as stated, at least some plants seems to grow quite satisfactorily if they receive only but narrowband light radiation at each of a requisite multiplicity of wavelengths as PAR, and no other radiation wavelengths whatsoever, 2. A Lighting System for Producing Photosynthetically Active Radiation ("PAR") in Narrow Spectral Bands Accordingly, in one of its aspects the present invention is embodied in a lighting system for producing photosynthetically active radiation ("PAR").

The lighting system includes (1) a first plurality of light sources producing a first plurality of narrowband light emissions at a first plurality of emission wavelengths that are within the range from 400 to 760 nanometers wavelength where more than 51% of the light flux at each of said first plurality of emission wavelengths is within ±5 nanometers wavelength of an emission peak, and is thus called "narrowband"; and (2) a second plurality of light sources producing a second plurality of narrowband light emissions at a second plurality of emission wavelengths within the range from 400 to 760 nanometers wavelength where more than 51% of the light flux at each of said second plurality of emission wavelengths is within ±5 nanometers wavelength of the emission peak, and is thus again called "narrowband". By this construction more than 51% of the total light flux of all the light emissions at all the first and the second pluralities of emissions wavelengths made by all the first and the second pluralities of light sources is within 10 nanometers wavelength about an associated emission peak, thus making that less than half the total light flux is without these narrowband spectral ranges of the first, and of the second, pluralities of emissions wavelengths.

More preferably, in this lighting system more than 90% of the light flux at each of said first plurality of emission wavelengths is within a narrow band of some 10 nanometers wavelength about an associated emission peak; and more than 90% of the light flux at each of said second plurality of emission wavelengths is likewise again within a narrow band of some 10 nanometers wavelength about an associated the emission peak;

3. A Lighting System for Producing Photosynthetically Active Radiation ("PAR") in Narrow Spectral Bands About a Limited Number of Predetermined Center Wavelengths In another of its aspects the present invention is again embodied in a lighting system for producing photosynthetically active radiation ("PAR"), the system producing narrowband radiation at and about each of a number of predetermined spectral wavelengths.

In this aspect of the invention a lighting system for producing photosynthetically active radiation ("PAR") consists of a multiplicity of narrowband light sources, more than 4 but 15 or less in number, producing a corresponding multiplicity of narrowband light emissions at, and roughly centered about, a corresponding multiplicity of emission wavelengths within the range from 360 to 760 nanometers wavelength, wherein more than 50% of the light flux produced at each of said multiplicity of emission wavelengths is within a bandwidth of 10 nanometers or less containing a corresponding emission peak, and is thus called "narrowband emission".

By simple calculation, since the maximum number of light sources is 15 and the actual number can be as low as 4, and since each of these light sources does produce more than 50% of its light flux within a maximum bandwidth of 10 nanometers, then more than 50% of the total light flux is produced within a maximum total bandwidth of only 150 nanometers of less, making that, at most, the remaining 250 nanometers bandwidth between 360 and 760 nanometers contains less than 50% the total light flux produced by the multiplicity of narrowband light sources.

Indeed, it is preferred that each of the narrowband light sources does produce more than 90% of its light flux within a maximum bandwidth of but 10 nanometers. In this case, since the maximum number of light sources is 15 and the actual number can be as low as 4, and since each of these light sources does produce more than 90% of its light flux within a maximum bandwidth of 10 nanometers, then more than 90% of the total light flux is produced within a maximum total bandwidth of only 150 nanometers of less, making that, at most, the remaining 210 nanometers bandwidth between 400 and 760 nanometers contains less than 10% the total light flux produced by the multiplicity of narrowband light sources.

In this lighting system the maximum number of narrowband light sources is preferably only 10. Again by simple calculation, since the maximum number of light sources is 10 and the actual number can be as low as 4, and since each of these light sources does produce more than 90% of its light flux within a maximum bandwidth of 10 nanometers, then more than 90% of the total light flux is produced within a maximum total bandwidth of only 100 nanometers of less, making that, at most, the remaining 260 nanometers bandwidth between 400 and 760 nanometers contains less than 10% the total light flux produced by multiplicity of narrowband light sources. Equivalently stated, at least some 260 nanometers of the 360 nanometers bandwidth between 400 nanometers and 760 nanometers, or $260/360=13/18=$more than ⅔rds of this entire spectral range, contains less than 10% of the total light flux produced by the multiplicity of narrowband light sources.

In this lighting system the narrowband light sources preferably include (1) a first narrowband light source producing a light emission in a narrow band including a wavelength of 430 nanometers that is a first absorption peak of chlorophyll A; (2) a second narrowband light source producing a light emission in a narrow band including a wavelength of 662 nanometers that is a second absorption peak of chlorophyll A; (3) a third narrowband light source producing a light emission in a narrow band including a wavelength of 453 nanometers that is a first absorption peak of chlorophyll B; and (4) a fourth narrowband light source producing a light emission in a narrow band including a wavelength of 642 nanometers that is a second absorption peak of chlorophyll B.

The narrowband light sources preferably still further include (5) a fifth narrowband light source producing a light emission in a narrow band including a wavelength of 450 nanometers that is a first absorption peak of beta carotene; and (6) a sixth narrowband light source producing a light emission in a narrow band including a wavelength of 480 nanometers that is a second absorption peak of beta carotene.

The narrowband light sources preferably still further include (7) a seventh narrowband light source producing a light emission in a narrow band including a wavelength of 620 nanometers that is an absorption peak of phycocyanin.

The narrowband light sources preferably still further include (8) an eighth narrowband light source producing a light emission in a narrow band including a wavelength of 670 nanometers that is a first wavelength involved in the Emerson effect; and (9) a ninth narrowband light source producing a light emission in a narrow band including a wavelength of 700 nanometers that is a second wavelength involved in the Emerson effect.

In this PAR lighting system of ten narrowband emissions the radiative energy, $E=hv$, of (1) the first, and (2) each of a majority of the third through the ninth light sources, is within 50% of a same energy.

More preferably the radiative energy, $E=hv$, of the second light source is within 50% of twice, $X2$, the radiative energy that is within each of the first, and each of a majority of the third through the ninth, light sources.

4. An Energy-Conserving Method of Applying Photosynthetically Active Radiation ("PAR") Effective for Photosynthesis to Plants In yet another of its aspects the present invention is again embodied in an energy-conserving method of applying photosynthetically active radiation ("PAR") effective for photosynthesis to plants.

In the preferred method PAR is applied to plants in a multiplicity of narrow bands, more than 4 but 15 or less in number, within the range from 400 to 760 nanometers wavelength, wherein more than 50% of the PAR flux at each of said multiplicity of emission frequencies is within a bandwidth of 10 nanometers or less containing a corresponding emission peak, and is thus called narrow band emission. By simple calculation, since the maximum number of narrow bands is 15, and since each of these narrow bands does have more than 50% of its PAR flux within a maximum bandwidth of 10 nanometers, then more than 50% of the total PAR flux is applied within a maximum total bandwidth of only 150 nanometers of less, making that, at most, the remaining 210 nanometers bandwidth between 400 and 760 nanometers receives less than 50% the total PAR flux from the multiplicity of narrowband light sources. The applying results in less than 50% of the total applied PAR flux falling within a bandwidth of at least 210 nanometers, and thus uses less energy than any hypothetical method that would apply PAR flux in this at bandwidth of at least 210 nanometers which PAR flux was at least equal to that applied in a maximum total bandwidth of 160 nanometers.

The application of PAR preferably includes first-applying PAR in a narrow band including a wavelength of 430 nanometers that is a first absorption peak of chlorophyll A; second-applying PAR in a narrow band including a wavelength of 662 nanometers that is a second absorption peak of chlorophyll A; third-applying PAR in a narrow band including a wavelength of 453 nanometers that is a first absorption peak of chlorophyll B; and fourth-applying PAR in a narrow band including a wavelength of 642 nanometers that is a second absorption peak of chlorophyll B.

The application of PAR preferably further includes fifth-applying PAR in a narrow band including a wavelength of 450 nanometers that is a first absorption peak of beta carotene; and sixth-applying PAR in a narrow band including a wavelength of 480 nanometers that is a second absorption peak of beta carotene The application of PAR preferably still further includes seventh-applying PAR in a narrow band including a wavelength of 620 nanometers that is an absorption peak of phycocyanin.

The application of PAR preferably still further includes eighth-applying PAR in a narrow band including a wavelength of 670 nanometers that is a first wavelength involved in the Emerson effect; and ninth-applying PAR in a narrow band including a wavelength of 700 nanometers that is a second wavelength involved in the Emerson effect.

Most preferably in the method each of (1) the first-applying, and (2) a majority of the third-applying through the ninth-applying, is of PAR that is within 50% of a same energy.

The second-applying is most preferably of PAR that is within 50% of twice, X2, the radiative energy that is within each of the first-applying, and a majority of the third-applying through the ninth-applying.

5. The Present and Related Inventions Hold Out the Possibility of Converting to Electricity the Natural Sunlight Falling Upon a Unit Area of Earth to Produce Therewith Using Lamps Photosynthetically Active Radiation (PAR) that is of Greater Advantage to the Growth of Plants that was the Sunlight Itself Although plant growth can be stimulated by PAR that is both (1) more intense (up to approximately six (6) suns), and (2) of greater duty cycle (up to continuous, 24 hours a day), than is natural sunlight, the preferred multiple narrowband PAR of the present invention will work quite well to engender plant growth when the narrowband PAR applied at each frequency, or frequency band, is (1) no brighter (i.e, no more intense) than is sunlight itself (2) across a normal growing day.

Moreover, the present invention is at least ⅔rds more efficient than is natural sunlight to do so, and the related invention of an accompanying patent application is—quite independently—again believed to be more than ⅔rds more efficient than is natural sunlight The present and related inventions thus involve two discoveries, and the invalidation of certain previous beliefs.

First, it has been found that it is not necessary to incur the energy cost of providing one or more substantially broad spectrum—meaning 90% emission spectrums of tens to hundreds of nanometers in width—lights to promote the growth of plants. For example, previous "grow lights" often produce both blue (400 nm) and red (700 nm) light in two emission spectrums each hundreds of nanometers in width. Instead, it has been found that lights of more than two, and as many as six or seven, wavelengths may usefully be employed, but that these emission wavelengths may be, by standards of the prior art, incredibly narrow, and as narrow as ±1 nm about a center wavelength, or 2 nm total.

Depending upon the intensity of the emitted radiation(s) at each and at all wavelengths, the mere use of multiple (for example, six) narrowband illumination wavelengths does not guarantee any energy savings. However, it has been found that each and all of the preferred narrowband illuminations (of the present invention) need be substantially no more intense than were the corresponding wavelengths of broadband illumination (of the prior art). Accordingly, when the plant grows at the same or a better rate towards the same healthy mature result, the savings of multiple narrowband illuminations (in accordance with the present invention) over perhaps two broadband illuminations (of the prior art) is in proportion to the reduction in total bandwidth of illumination, which is typically better than 90% in the present invention.

Second, it has been found that grow lights of any emission wavelengths and bandwidths, and particularly the preferred multi-wavelength narrow-bandwidth grow lights, are, when pulsed at kilohertz frequencies, suitably of very low duty cycle. "Very low duty cycle" does not mean any 50% duty cycle, as has previously been contemplated to lessen any potential for overheating of LED light sources, but ratter duty cycles that are less than 5%, and preferably as low as 1% and lower. Normally all the several illumination wavelengths are turned "ON" and "OFF" ast the same times. Note that the use of the words "wavelength" and "frequency" in this paragraph is as is explained at section 2.3 of the BACKGROUND OF THE INVENTION section of this specification. "Wavelength" refers to the spectral nature of the applied PAR light. "Frequency" refers to how it is modulated in application.

Depending upon the intensity of the illumination(s) at each and at all wavelengths when "ON", the mere use of very low duty cycle illumination in accordance with the present invention does not guarantee any energy savings. However, it has been found that the flux, or intensity, of illumination(s) at all wavelengths need be no greater than about ten times (×10), and most normally about three times (×3)—or less—than were the intensities of illumination at the corresponding wavelengths within the PAR of the prior art where the intensity is much more even. To say again, depending on the particular plant receiving the new PAR of the present invention, and how rapidly the plant is desired to grow, the intensity, or flux (as corresponds to energy) at each of the preferred nine illumination wavelengths may well be higher—most normally about times three (×3) higher—than was the intensity, or flux, at the same wavelengths within the prior art PAR. However, and importantly, it will by now be understood that the new PAR of the present invention is narrowband (at a number, typically nine, illumination wavelengths), and that essentially no illumination at all transpires outside these narrow bands. The energy of illumination is represented by the area under the curve that shows the illumination intensity/flux versus wavelength for the PAR applied. Although regionally (normally) higher, the new PAR in accordance with the present invention has much less area under its intensity versus wavelength curve than does the PAR of the prior art. Most typically the new PAR of the present invention shows at least five times (×5) less area and, correspondingly, times five (×5) electrical energy used in the production of this new PAR, mutatis mutandis. Indeed, for some plants and some spectrums—including intensity as well as wavelength of PAR illumination—the new PAR of the present invention may be produced with even greater savings in electrical energy, perhaps a 90% energy savings over the prior art PAR.

Accordingly, when the plant grows at the same or a better rate towards the same healthy mature result, the energy savings of very narrow spectrum PAR illuminations (in accordance with the present invention) is considerable, and up to 90%.

The inventors of the present invention also validate at least two previous beliefs. First, plants grow best when the Photosynthetically Active Radiation ("PAR") received by the plant varies over the life of the plant. The inventors prefer, as may be suggested by the prior art, a tripartite "growing season where lights accentuated in blue wavelengths are administered during a first, "Spring", third of the life of the plant; lights accentuated in both blue and red wavelengths are administered during a second, "Summer", third of the life of the plant; and lights accentuated in red wavelengths are administered during a third and final, "Fall", third of the life of the plant. Of course, the particular mix of wavelengths taught herein this specification as optimally so preforming were not known in the prior art.

The inventors of the present invention also confirm that grow lights, of whatsoever nature, are, for most (but not all) plants, beneficially kept on all the time.

These facts, and these preferences, are, of course, fully compatible with the narrow band PAR of the present invention.

6. The Provision of Multiple Wavelengths of Narrow-spectrum Illumination to a Plant is Optimally Efficient for Photosynthesis Per Unit Energy (Of All Lights Applied)

In accordance with the present invention it is wrong, and wasteful, that a growing plant should be accorded that full spectrum of radiation that it absorbs. If the spectrum of the applied PAR is roughly matched to the absorption spectrum of the plant—as in the prior art—than a good deal of this PAR spectrum, and the energy that it contains, will be, if not completely wasted, sub-optimally employed to induce plant growth.

In accordance with the present optimal plant growth versus the cost of energy used to generate the light irradiance applied to the plant (under controlled growth conditions) is realized not by the presentation of a continuous spectrum of PAR (even it varying in intensity at different wavelengths) to the plant, but is instead realized by a presentation of a plurality of light radiation wavelengths that are each of narrow bandwidth. Each such narrowband PAR illumination wavelength most commonly contains 90% of its energy in a bandwidth of only some ±5 microns. Even if, as is preferred, a half dozen or more such substantially monochromatic lights are used to illuminate the plant, 6 times 20 microns equals but 120 microns, and this number is clearly inadequate to span the entire PAR spectral range, which is typically from 400 nm or less (blue light) to 760 nm of more (red light).

Accordingly, in accordance with the present invention, optimal photosynthesis per unit energy (of all lights applied) (commonly measured in $CO_2$ uptake per watt) is realized when the plant is illuminated with a plurality of different wavelength lights each of a narrow spectrum, the totality of the 90% energy spectrum of the combined lights being less than 50%, and more commonly one-third or less, of the 360 nm total width of the PAR spectrum (i.e., from 400 nm to 760 nm).

The inventors are uncertain as the exact reason that this multi-wavelength narrow spectrum illumination proves to be optimized for healthy plant growth relative to the energy cost of the light illuminating the plant. However, both chlorophyll A and chlorophyll B have reasonably narrow absorption spectra (respectively centered about approximately 680 nm and 480 nm wavelength, while the carotenoids also absorbing light energy within a plant do themselves have energy absorption profiles that show peaks. Accordingly, one reason why multi-wavelength narrow spectrum illumination woks may be that if a particular photosynthetic reaction can transpire in response to absorbed photons within a range of differing wavelengths, but responds best to photons of a particular wavelengths, then why "fool around" and why not give the reaction the exact wavelength light to which it is most amenable? This the present invention attempts to do.

Moreover, it is recognized by Tikhomirov et al., 1976; Lisovsky et al., 1987, and others that plants have a "growing season", a finite lifetime, and differing PAR sensitivities during their life. In accordance with the present invention the several wavelengths of the multi-wavelength narrow spectrum illumination are varied—preferably in three stages each over about ⅓ of the life of the plant—during the maturation of the plant. A first stage called "spring" is characterized in the relative more blue light is provided to the plant. In a second stage called "summer" the plant is provided with both "narrow spectrum" blue and red lights. Finally, in a third stage called "fall" the light provided to the plant have a larger red component than in the other two stages. The accentuation of certain PAR wavelengths at certain portions of the plant growth cycle is fully supported by the new, narrowband multiple-wavelength, PAR of the present invention.

These and other aspects and attributes of the present invention will become increasingly clear upon reference to the following drawings and accompanying specification.

DESCRIPTION OF THE PREFERRED EMBODIMENT

The subject of the present invention is the production, and the application, of Photosynthetically Active Radiation ("PAR") where the PAR is very efficient to produce desired normal growth and maturation of the plants. An efficient PAR means that less energy—normally in the form of electricity—can be used to produce the PAR and the resultant plant growth. This is true no matter what the means of (narrowband) electrical illumination, although LEDs are strongly preferred, Although a related patent application will teach another, independent, method of realizing an efficient and effective PAR, the efficiency gains of the present invention are essentially realized by production and application of (1) narrowband radiation (nominally ±5 nm, although as far as is known every single photon can have exactly the same wavelength (i.e., ±0 nm), about (2) each of a multiplicity of emission wavelengths, nominally nine such wavelengths. The (3) emission strength, or intensity, at each of the nominal nine (9) wavelengths can beneficially be different in flux intensity, and is nominally so different in ratios ranging from 1 to 3, and are more preferably in an approximate 3:2:1:1:2:4:2:1:1 ratio of flux magnitudes across the nine (9) nominal emission wavelengths.

A prior art graph showing the typical spectrum of absorption of light by a green plant, and the photosynthetic processes involved in this absorption, is shown in FIG. a1. Notably the plant primarily strongly absorbs light in the red and in the blue portions of the spectrum while absorbing relatively less (and thus reflecting relatively more) of the light in the green portion of the spectrum—although some green light is still absorbed. This pattern of absorption, and of reflection, is, of course, why most plants appear green in color.

Figure 1A:
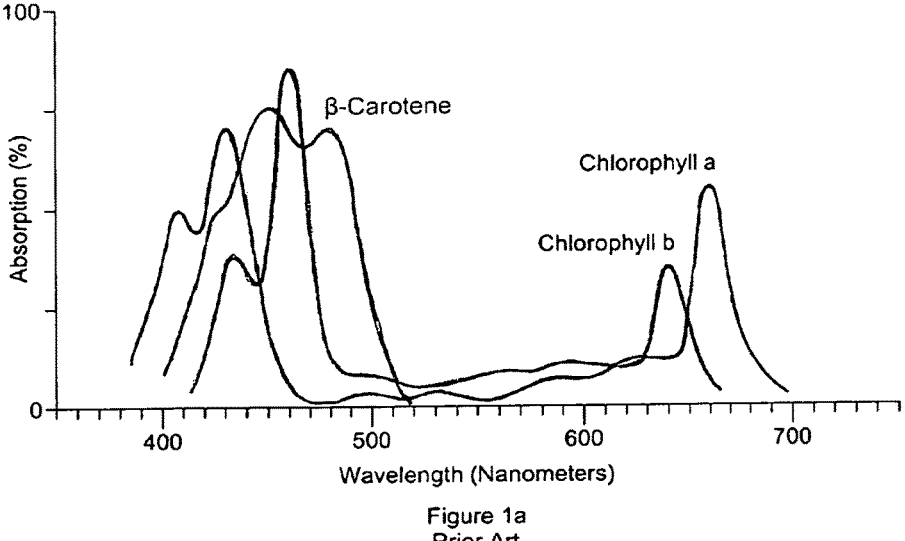
FIG. 1, consisting of FIGS. 1*a* and 1*b*, are prior art graphs respectively showing the typical spectrum of light absorption by photosynthetic processes transpiring in an exemplary green plant, and a typical spectrum of PAR that has been applied (with various modifications) in the prior art as a growth light for plants.
Figure 1B:
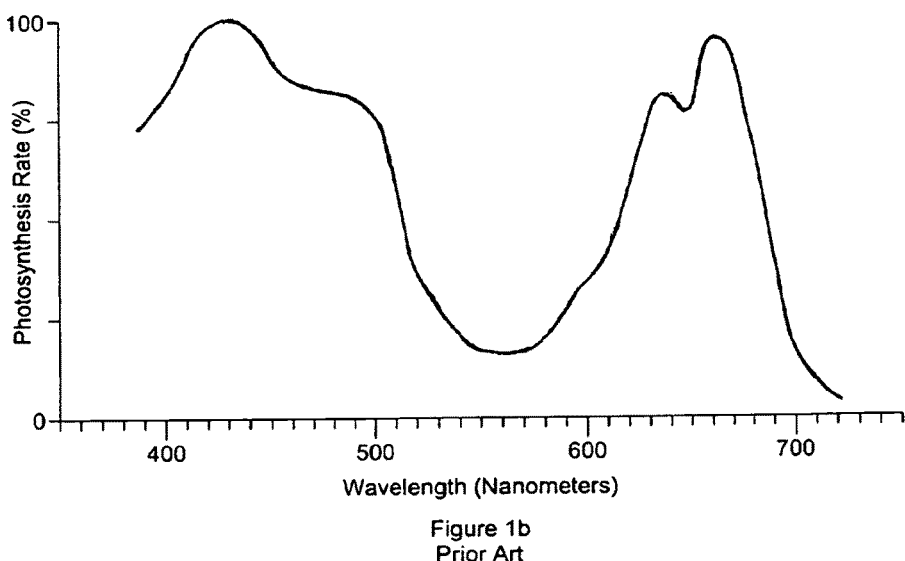

A prior art graph showing a typical spectrum of PAR that has been applied (with various modifications) as growth light for plants in the prior art is shown in FIG. 1b. The absorption spectrums of the photosynthetic processes involving each of chlorophyll A, chlorophyll B, and the carotenoids have been recognized, and are included in the composite PAR spectrum that is graphed. In accordance with the spectral absorption of these photosynthetic processes, and some apparent degree of recognition that a green plant may absorb green light but this green light is of little, or no, use to plant growth, the prior art has, apparently quite reasonably, considered to supply (varying amounts of) both red and blue lights to a plant as PAR. The area under the curve in FIG. 1b can be integrated to derive the total light flux supplied, but whatsoever this prior art PAR light flux may in detail be, it has obeyed the simple principle that the plant should roughly be supplied with those wavelengths, and at those intensities, of PAR that it's photosynthetically active processes have been shown to absorb. Until the present invention this has arguably seemed to be a quite reasonable approach. Indeed, this prior art PAR has proven successful to induce satisfactory growth in a number a green plants.

The present invention is based on the discovery that this prior art PAR spectrum is by no means optimal—particularly in the amount of energy consumed but also, to a lessor degree, in the amount and speed and quality of growth induced in many plants. The PAR energy is represented by the integrated area under the intensity/flux versus wavelength curve of FIG. 1b, and this integrated flux roughly corresponds to the electrical energy used to produce it. (It only "roughly corresponds because, it will be understood that, by Plank's Law, the flux of shorter wavelength (i.e., the color blue) intrinsically takes more electrical energy to produce. Plus if and when the composite flux of FIG. 1b should be produced from narrowband emitters—such as LEDs—then some colors may be produced more efficiently than others. Consequently, the integrated flux only roughly relates to the electrical used to produce it.)

Now comes the present invention as illustrated in the graphs of FIG. 2, consisting of FIGS. 2a through 2d. It has been found that a green plant grows perfectly satisfactorily, even optimally for some species, when it is supplied with narrowband PAR at only a select number of wavelengths: potentially as few as four (4) or five (5) such wavelengths. However, as a practical matter, some nine (9) such wavelengths are preferred. The intensity of the light supplied at each of these nominal nine (9) wavelengths is usually some multiple, up to ten times (×10) but most normally about three times (3×), greater than the corresponding light intensity at these wavelengths within the prior art "broadband" PAR. (The emission intensity at these nine wavelengths, and selected ones of them, can optionally be increased above normal levels to variously effectively (dependent upon plant type, maturation, other growing conditions, etc.) "supercharge" plant growth, although this is not required. Likewise, this ratio of from times three (×30 to times ten (×10) varies with the spectrum of the prior art PAR to which comparison is made—see FIG. 2d upcoming.)

Figure 2A:
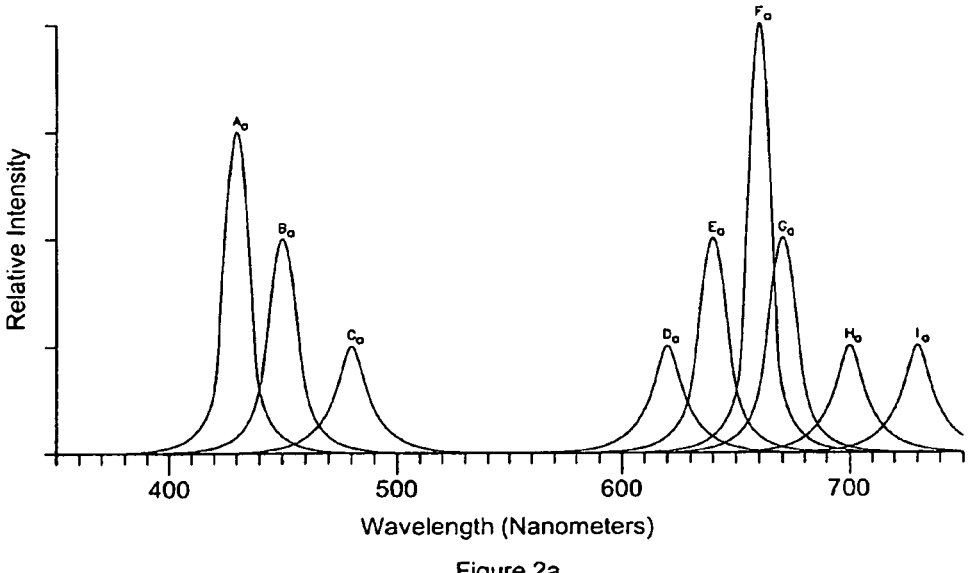
FIG. 2a is a graph showing one, nominal, preferred spectrum of PAR—well capable of being produced in the real world (using LEDs), and applied as growth light for plants—in accordance with the present invention.
Figure 2B:
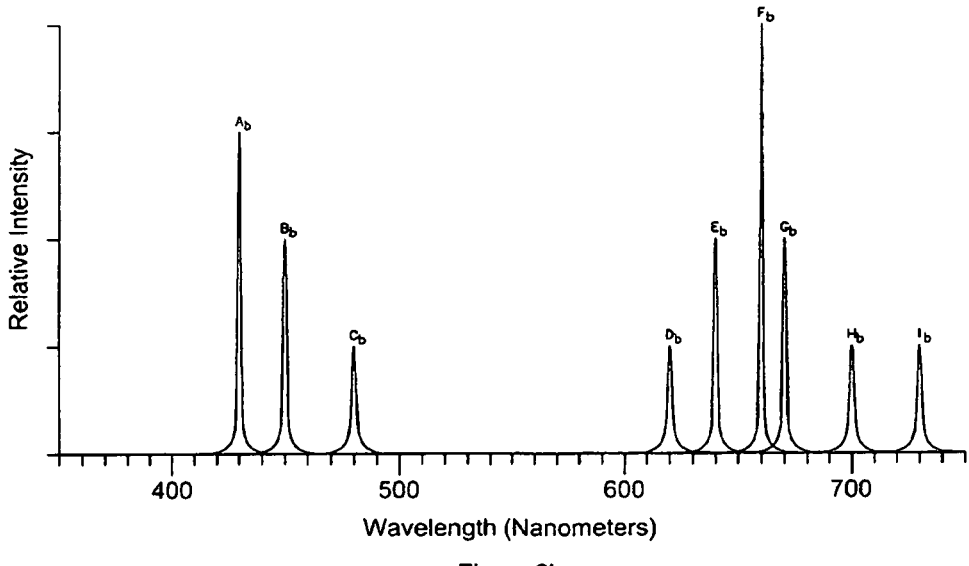
FIG. 2b is a graph showing another, aggressive, spectrum of PAR—still capable of being produced in the real world (using LEDs), and applied as growth light for plants—, this PAR spectrum being aggressive by comparison with the PAR spectrum of FIG. 2a for further narrowing the emission bandwidths in accordance with the present invention.

However, and regardless that the new PAR in accordance with the present invention may be of greater intensity/flux than heretofore at each, and at any, of the preferred nine wavelengths, the total integrated flux—as roughly corresponds to the electrical energy used to produce this flux— under the emission spectrum of the new PAR—shown in FIGS. 2a and 2b—is greatly less than total; flux, and corresponding total electrical energy, used to produce the exemplary prior art PAR shown in FIG. 1b.

A crude spectrum of the new PAR in accordance with the present invention such as may readily be implemented with "off the shelf" Light Emitting Diodes (LEDs) is shown in FIG. 2a. A more refined, and preferred, spectrum of the new PAR as is implemented with the LEDs, and with the circuits, hereinafter described is graphed in FIG. 2b. An energy savings in the production of the PAR is immediately realized in both spectrums. Effectively no light illumination whatsoever need be delivered to most plants outside of narrowband light illumination(s) at each of the nominal nine (9) wavelengths. Any energy, commonly in the form of electricity, used to produce PAR radiation outside these nominal nine (9) spectral regions is effectively wasted for most plants. The total flux integrated under the curves of the preferred PAR—and the electrical energy used to produce this flux—is less for the PAR of the present invention, and is most commonly from times five (×5) to times ten (×10) less than the prior art PAR. Yet the illuminated plants illuminated with the new PAR of the present invention grow as well, or better, than with the PAR of the prior art.

Although the inventors cannot be held to render a correct scientific explanation of why their invention of the production and use of but narrowband PAR at each of multiple emission wavelengths works, it seems as if the processes of photosynthesis, and photochemistry, ultimately obey normal chemical equations, making that energy(ies) deviating from the preferred "center" energy of reaction are increasingly ineffective to promote the reaction, and are increasingly wasted. In simple terms, photosynthesis, and photochemistry, must be regarded first and foremost as chemistry— where it is well know that certain reactions proceed optimally at certain energies (and/or temperatures)—and only secondarily as photonics and photosynthesis. As has been previously explained, a chemical or a photochemical, reaction will proceed with energies, or photonic energies, that are deviating from, and different from, any single optimal energy, or photonic energy.

But, if artificial PAR, and "grow lights" are used, why give any plant other that the radiations that it can optimally use in its photosynthetic processes? It is thus the premise of, and the discovery behind, the present invention that PAR should be optimized to precisely what a plant requires for its photochemical and photosynthetic processes, and not, more crudely, all such PAR as the plant, and its said photosynthetic processes, can absorb.

A graph showing one, nominal, preferred spectrum of PAR—well capable of being produced in the real world (using LEDs)—applied as growth light for plants in accordance with the present invention is shown in FIG. 2a. Nine emission peaks $A_a$-$I_a$ are visible. These peaks are preferably centered about (or the narrowband emission does at least contain) the following wavelengths:

$A_a$. 430 nanometers—first absorption peak of chlorophyll A $B_a$. 450 nanometers—first absorption peak of both chlorophyll B and beta carotene $C_a$. 480 nanometers—second absorption peak of beta carotene $D_a$. 620 nanometers—absorption peak of phycocyanin $E_a$. 640 nanometers—second absorption peak of chlorophyll B $F_a$. 660 nanometers—second absorption peak of chlorophyll A and phytochrome $G_a$. 670 nanometers—first wavelength involved in the Emerson effect $H_a$. 700 nanometers—second wavelength involved in the Emerson effect.

$I_a$. 730 nanometers—first absorption peak of phytochrome

The emission intensity (which is nearly, but not exactly the same as the energy of emission E=hv] between each of the nominal nine wavelengths A:B:C:D:E:F:G:H:I is nominally approximately in a 3:2:1:1:2:4:2:1:1 ratio, as is suggested by both the maximum heights of each emission peak, and the area under the curve at that peak, in FIG. 2a, A new PAR of still better characteristics than those shown in FIG. 2a can be realized by the careful selection and interconnection of electrical components hereinafter described. This "better" new PAR—which may be considered "state of the art realizable by commercially available components circa 2012"—is diagrammed in FIG. 2b. Clearly the total integrated area under the nine (9) narrowband emission peaks is quite small if these peaks are even remotely of normal intensity/flux; which they are and which will be illustrated in FIG. 2d upcoming.

Figure 2C:
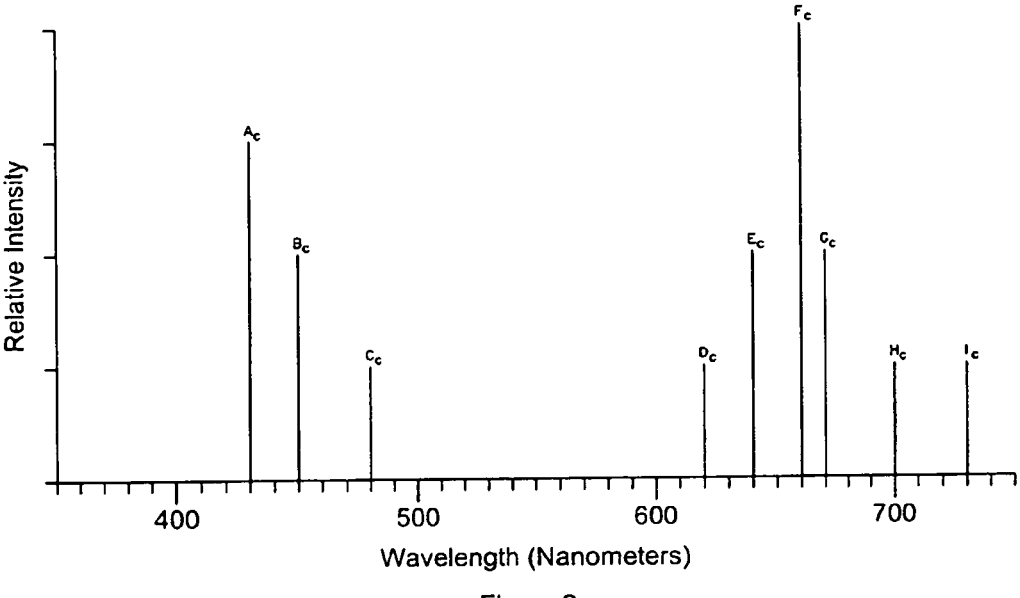
FIG. 2c is a graph showing just how narrowband a preferred spectrum of PAR in accordance with the present invention may theoretically be, with the PAR being produced and applied at but essentially a small number, nominally nine (9), individual wavelengths.

In accordance with the present invention, a graph showing just how narrowband a preferred spectrum of PAR in accordance with the present invention may carefully be made to be, with the produced and applied PAR being essentially at but a number, nominally nine (9), individual wavelengths, is shown in FIG. 2c. The vertical axis (and left scale) is RELATIVE INTENSITY, so the height of the peaks should not be compared with FIGS. 2a and 2b FIG. 2b simply shows that a practical—indeed, and optimally energy efficient—PAR may be generated and used when all the energy is within photons at, and of but arbitrarily narrow deviation about, but "two handfuls" of wavelengths, namely nine (9) such wavelengths. Although this curve is presently, circa 2012, impractical to realize—and could perhaps be realized only but with lasers—to the best knowledge of the inventors many common plants will grow if exposed to a PAR that contains photons of only nine wavelengths.

The energy savings of the present invention providing for the production, and the use, of PAR that is narrowband about only but a few wavelengths should be very evident from FIGS. 2a and 2b. Namely, all the energy that is within the PAR can be put at selected wavelengths, and there is no real need to illuminate at other wavelengths.

Figure 2D:
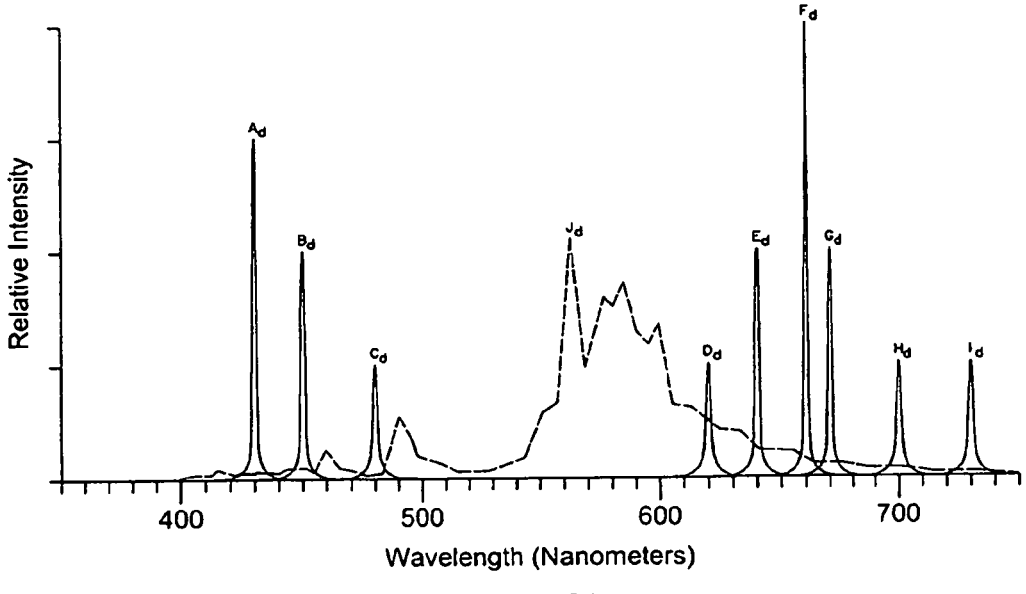
FIG. 2d is a graph again showing aggressive spectrum of PAR radiation previously seen in FIG. 2b juxtaposed against a typical prior art PAR spectrum of prior art grow lights.

A graph showing how high are the intensity/levels of the extremely narrowband preferred spectrum of NEW PAR in accordance with the present invention is shown in FIG. 2d. The dashed line is the emission spectrum of a broadband halide grow light (i.e., a producer of PAR) circa 2012. The spectrum does not look much like the spectrum of the new PAR of the present invention, shown in solid line. Note that some intensity/flux peaks of the new PAR equal, and some exceed, the peak emissions of the PRIOR art PAR. However, the integrated area under old, and new, PAR spectrums— which integrated area is indicative of the energy cost to produce the PAR should the electrical lamps be of equal efficiency—greatly favors the new PAR. In actual fact the new PAR is produced by LEDs which are greatly more efficient in the amount of electricity consumed per unit light flux produced than are the broadband halide lamps used to produce the old PAR; making that the new PAR is more energy efficient in production as well as in its narrowband nature.

Figure 3A:
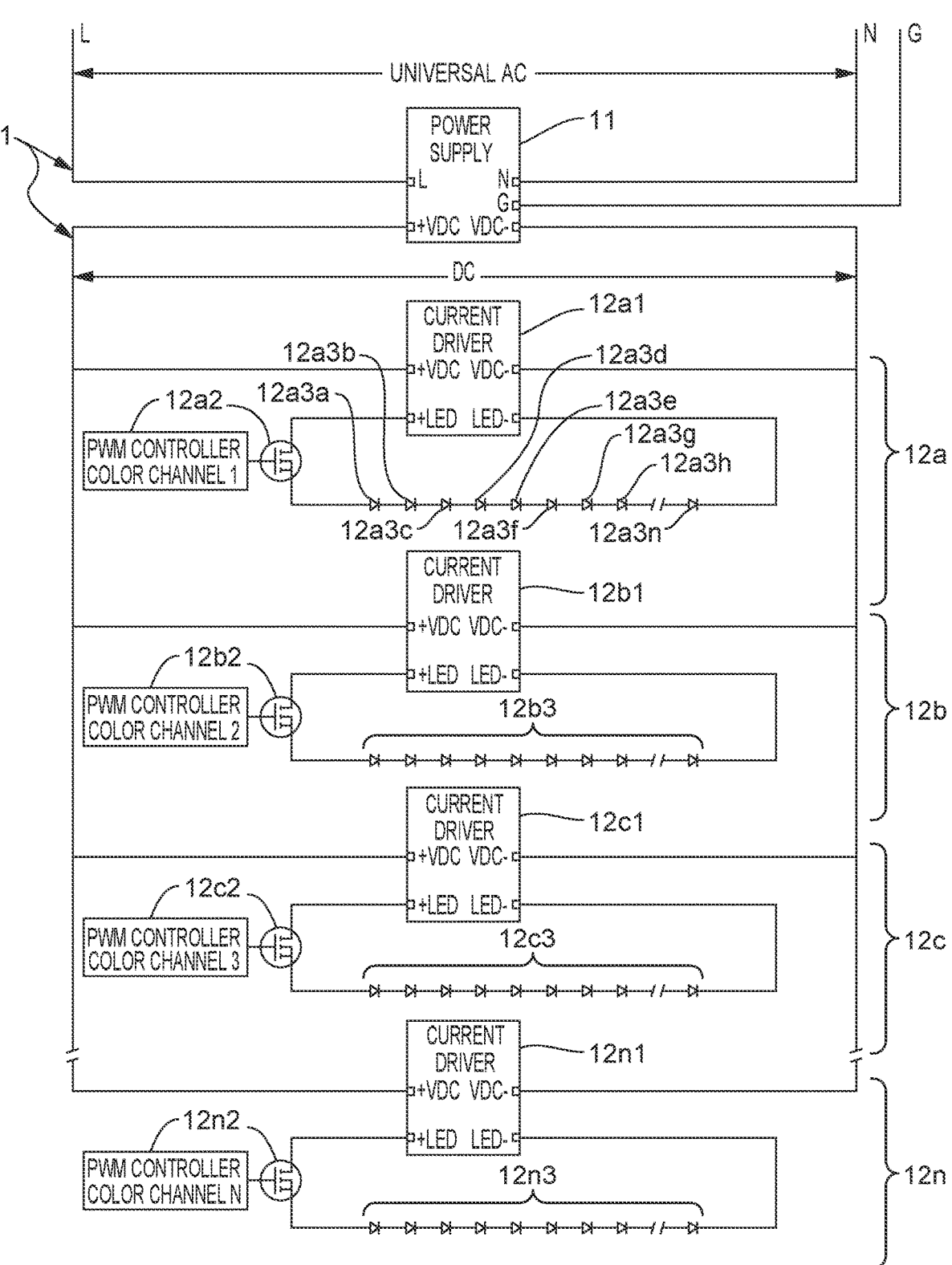
FIG. 3a is a first schematic diagram of the driver of a real-world system using LEDs to produce PAR in each of multiple narrow bands in accordance with the present invention, which PAR was seen in the graphs of FIGS. 2b and 2d, FIGS. 3b and 3c are second and third schematic diagrams of alternative connections of both (1) the driver of FIG. 3a, and (2) multiple LEDs, in order to produce the PAR in each of multiple narrow bands in accordance with the present invention, which PAR was previously seen in the graphs of FIGS. 2b and 2d.
Figure 3B:
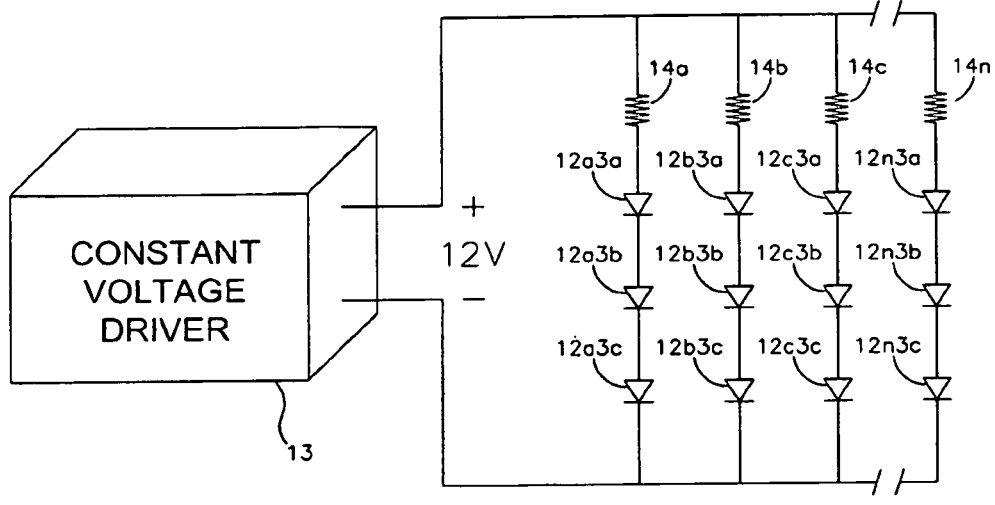
Figure 3C:
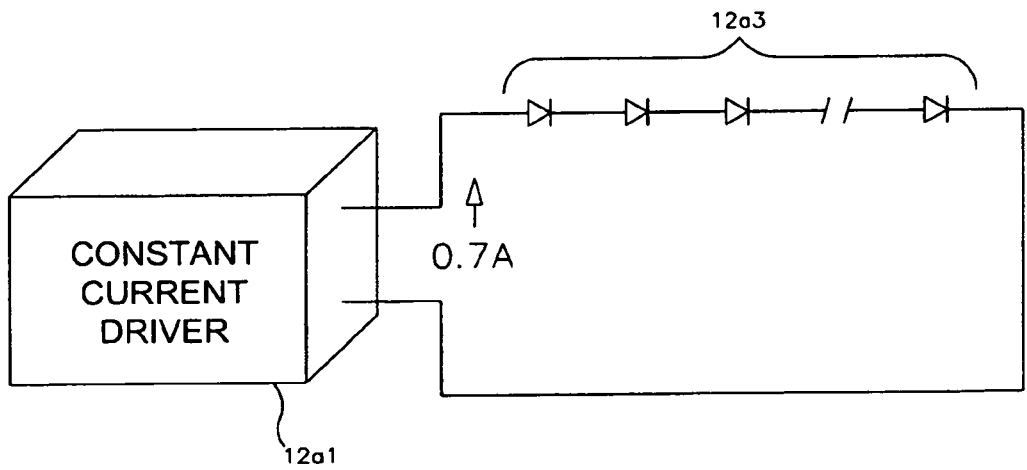

A first schematic diagram of the driver of LEDs to produce PAR in each of multiple narrow bands in accordance with the present invention, which PAR was seen in the graphs of FIGS. 2*b* and 2*d*, is shown in FIG. 3*a*. Second and third schematic diagram of alternative connections of (1) the driver of FIG. 3*a* and (2) multiple LEDs, in order to produce the new PAR of the present invention in each of multiple narrow bands—which PAR was seen in the graphs of FIGS. 2*a* and 2*d*—are shown in FIGS. 3*b* and 3*c*.

In these schematic diagrams of FIG. 3, a grow light assembly 1 typically consists of an indeterminate number, typically from one to ten, grow light sub-assemblies 1, 2, . . . N. The grow light 1, and the grow light sub-assembles 1, 2, . . . N are connected to, and between, alternating current (a.c.) power line L, neutral N, and ground G. A current driver 1, 2, . . . N produces direct current (d.c.) power sufficient, as respectively gated through PWM controllers 1, 2, . . . N, to power LED light strings 1, 2, . . . N.

Each sub-assembly normally produces but one, or two, PAR wavelengths, depending upon the grow room illumination intensities desired. The number of LEDs 1 through N in each string determines, along with the type of LED, the intensity, and the relative intensity, of the produced new PAR light. For example it may be recalled by reference to FIG. 2*a* that the relative intensities of the nominal nine wavelengths A:B:C:D:E:F:G:H:I was nominally approximately in a 3:2:1:1:2:4:2:1:1 ratio. If the LEDs of different colors each produce about the same light flux per current applied and consumed—which is very nearly the case—than a first narrowband spectral peak will be produced from 3 LEDs of about 430 nanometers emission wavelength, a second from 2 LEDs of about 450 nanometers emission wavelength, and so on.

UNIVERSAL AC (alternating current) power between line L and neutral N is nominally of magnitude 120 VAC. This UNIVERSAL AC is converted in POWER SUPPLY 11 to DC direct current) power between VDC (direct current voltage) and VDC-C (direct current voltage common). An individual POWER SUPPLY 11 typically powers a plurality of light strings 12, illustrated in FIG. 3 to be three in number light strings 12*a*-12*c*. The POWER SUPPLY 11 may be, for example, type HLG series available from Meanwell.

Each light string 12*a*-12*c* respectively consists of a CURRENT DRIVER 12*a*1-12*c*1, a POWER CONTROLLER COLOR CHANNEL 12*a*2-12*c*2, and a multiplicity of LEDs 12*a*3*a*-12*a*3*n*, 1223*a*-12*b*3*n*, and 12*c*3*a*-12*c*3*n*, The respective CURRENT DRIVERs drive the respective LED strings 12*a*3*a*-12*a*3*n*, 1223*a*-12*b*3*n*, and 12*c*3*a*-12*c*3*n*, The CURRENT DRIVERs 12*a*1-12*c*1 are 12 VDC constant voltage waterproof drivers. Rudimentary versions use resistors to bias current to desired levels. The preferred CURRENT DRIVERs 12*a*1-12*c*1 use constant current drivers to eliminate inefficient resistors and to drive longer strings of series-connected LEDs 12*a*3*a*-12*a*3*n*, 1223*a*-12*b*3*n*, or12*c*3*a*-12*c*3*n*.

This LED drive current for each LED string is gated through and by a respective POWER CONTROLLER COLOR CHANNEL 12*a*2-12*c*2. Each POWER CONTROLLER COLOR CHANNEL 12*a*2-12*c*2. consists of low voltage logic for developing a switching signal that is applied to an associated MOSFET power gating transistor to selectively intermittently energize an associated LED light string from the associated CURRENT DRIVER 12A1-12C1 in accordance with the related invention, and patent application. For the purposes of this invention, and this patent application, the CURRENT DRIVERs 12A1-12C1 may be considered to be continuously gating dc power from a CURRENT DRIVER 12A1-12C1 to an associated LED strings 12*a*3*a*-12*a*3*n*, 1223*a*-12*b*3*n*, or12*c*3*a*-12*c*3*n*.

The preferred LEDs of each LED string are:

| Identification numeral | base type | Produces emissions including |
|---|---|---|
| 12a3a, 12b3a, 12c3a | Vollong 3 W High Power LED | 430 nanometers |
| 12a3b, 12b3b, 12c3b | Vollong 3 W High Power LED | 450 nanometers |
| 12a3c, 12b3c, 12c3c | Vollong 3 W High Power LED | 480 nanometers |
| 12a3d, 12b3d, 12c3d | Vollong 3 W High Power LED | 620 nanometers |
| 12a3e, 12b3e, 12c3e | Vollong 3 W High Power LED | 640 nanometers |
| 12a3f, 12b3f, 12c3f | Vollong 3 W High Power LED | 660 nanometers |
| 12a3g, 12b3g 12c3g | Vollong 3 W High Power LED | 670 nanometers |
| 12a3h, 12b3h, 12c3h | Vollong 3 W High Power LED | 700 nanometers |
| 12a3i, 12b3i, 12c3i | Vollong 3 W High Power LED | 730 nanometers |

All LEDs are custom modified from the indicated base type by manufacturer Vollong Electronics Co., Limited, Wufang District, Jinxia, ChangAn Town, DongGuan, Guang-Dong, China.

LEDs of other types may be used for production of narrowband PAR at other wavelengths.

The connection of the driver of FIG. 3*a* as a CONSTANT CURRENT DRIVER 33 to multiple LEDs strings in electrical parallel is shown in the schematic diagram of FIG. 3*b*. The connection of the driver of FIG. 3*a* as a CONSTANT VOLTAGE DRIVER 12*a*1 to multiple LEDs 12*a*3 in electrical series is shown in the schematic diagram of FIG. 3*c*. Either connection can be used to produce the PAR in each of multiple narrow bands in accordance with the present invention, which PAR was previously seen in the graphs of FIGS. 2*b* and 2*d*.

As became clear during observation of the graphs of FIG. 2, the circuit of FIG. 3*a* results in generation of a PAR that is detectably distinct from all PAR of which the inventors are aware within the prior art. Namely, PAR in accordance with the present invention is noticeably concentrated at a limited number (nominally nine) emission peaks each at a different wavelength while an extensive portion of the absorption spectrum of the plant receives no PAR radiation at all. Indeed, still other portions of the PAR provided the plant receive—in accordance with how narrow an emission spectrum can be realized by a particular preselected LED existing in the real world circa 2012—but very little radiation. Although it is not gainsaid but that radiation falling within, and even outside, of a nominal ±5 nanometers wavelength, about any of the nominal nine (9) emission wavelengths can be used by the plant, there is not only no indication that this broadening of emission wavelengths—howsoever slight—is either useful or beneficial, but, indeed, it looks as if the plant could beneficially receive every single photon at but one of the nine nominal wavelengths, ±1 nanometers or ±0.5 nanometers or, should it be physically possible, even ±0 nanometers wavelength.

Consider what the means as regards the appearance, and the distinctiveness, of the spectrum of the most preferred PAR produced, and applied to plants, in accordance with the present invention. Essentially PAR emission can be a number of different wavelengths which not even overlap one another, let alone fill the entire wavelength spectrum (nor any substantial portion of it) from 360 nm to 760 nm. Energy savings are effected—regardless of the technology by which the new PAR is produced—from not providing PAR illumination into that portions of the spectrum where it is less effective, or even ineffective, to promote plant growth.

An alternate embodiment of an energy-conserving method according to the disclosed subject matter can apply photosynthetically active radiation ("PAR") effective for photosynthesis to plants. The method can include: applying PAR to plants in a multiplicity of narrowband emissions between 360 and 760 nanometers wavelengths so that more than 80% of the total PAR flux is applied within a maximum total bandwidth of only 150 nanometers wavelength or less, making that, at most, the a remaining bandwidth of 250 nanometers bandwidth between 360 and 760 nanometers receives less than 20% the total PAR flux from said multiplicity of narrowband light sources; wherein the applying results in less than 20% of the total applied PAR flux falling within a bandwidth of at least 250 nanometers wavelength, and thus uses less energy than any hypothetical method that would apply PAR flux of more than 20% in this bandwidth of at least 250 nanometers; and wherein a minimum of 80% of PAR flux falls within 150/400=⅜ths of PAR bandwidth between 360 and 760 nanometers leaving that a maximum of 20% of PAR flux falls within a 250/400=⅝ths of the same 360 nm to 760 nm PAR bandwidth.

An alternate embodiment of a method according to the disclosed subject matter can apply photosynthetically active radiation ("PAR") effective for photosynthesis to plants. The method can include: applying PAR to plants in a multiplicity of four or more narrowband emissions between 360 and 760 nanometers wavelengths wherein these narrowband emissions both (1) total in combination more than 80% of the total PAR flux applied, and with (2) this 80% or more of the narrowband flux applied itself totaling a maximum total bandwidth of only 150 nanometers wavelength or less; wherein this makes that the remaining 250 nanometers bandwidth between 360 and 760 nanometers receive less than 20% the total PAR flux applied.

According to these variations, and still others within the skill of a practitioner of the artificial grow light, or PAR, arts, the present invention should be considered in accordance with the following claims, only, and not solely on accordance with those embodiments within which the invention has been taught.

What is claimed is:
1. An energy-conserving method of applying photosynthetically active radiation ("PAR") effective for photosynthesis to plants, the method comprising:
applying PAR to plants in a multiplicity of narrowband emissions within a range from 360 to 760 nanometers wavelength; wherein
each of the multiplicity of narrowband emissions has a PAR flux and more than 50% of the PAR flux at each of said multiplicity of narrowband emissions is within a bandwidth of 10 nanometers wavelength or less containing a corresponding local emission peak; and wherein
more than 50% of a total of the PAR flux for the multiplicity of narrowband emissions is applied within a maximum total bandwidth of 150 nanometers wavelength or less, and a remaining bandwidth of 250 nanometers between 360 and 760 nanometers receives less than 50% the total PAR flux from the multiplicity of the narrowband emissions.
2. The method according to claim 1 wherein the applying of PAR comprises:
a first-applying PAR including a wavelength of 430 nanometers that is a first absorption peak of chlorophyll A;
a second-applying PAR including a wavelength of 662 nanometers that is a second absorption peak of chlorophyll A;
a third-applying PAR including a wavelength of 453 nanometers that is a first absorption peak of chlorophyll B; and a fourth-applying PAR including a wavelength of 642 nanometers that is a second absorption peak of chlorophyll B.
3. The method according to claim 2 wherein the applying of PAR comprises:
a fifth-applying PAR including a wavelength of 450 nanometers that is a first absorption peak of beta carotene;
a sixth-applying PAR including a wavelength of 480 nanometers that is a second absorption peak of beta carotene.
4. The method according to claim 3 wherein the applying of PAR comprises:
a seventh-applying PAR including a wavelength of 620 nanometers that is an absorption peak of phycocyanin.
5. The method according to claim 4 wherein the applying of PAR comprises:
an eighth-applying PAR including a wavelength of 670 nanometers that is a first wavelength involved in the Emerson effect;
a ninth-applying PAR including a wavelength of 700 nanometers that is a second wavelength involved in the Emerson effect.
6. The method according to claim 2 wherein each of (1) the first-applying, and (2) a majority of the third-applying through the ninth-applying, is of PAR that is within 50% of a same energy.
7. The method according to claim 1 wherein the second-applying is of PAR that is within 50% of twice, ×2, a radiative energy that is within each of the first-applying, and a majority of the third-applying through the ninth-applying.
8. An energy-conserving method of applying photosynthetically active radiation ("PAR") effective for photosynthesis to plants, the method comprising:
applying PAR to plants in a multiplicity of narrowband emissions between 360 and 760 nanometers wavelengths so that more than 80% of a total PAR flux is applied within a maximum total bandwidth of only 150 nanometers wavelength or less, a remaining bandwidth of 250 nanometers between 360 and 760 nanometers receives less than 20% the total PAR flux from said multiplicity of narrowband emissions; wherein
less than 20% of the total PAR flux falls within a bandwidth of at least 250 nanometers wavelength; and wherein
a minimum of 80% of the total PAR flux falls within 150/400=⅜ths of a PAR bandwidth between 360 and 760 nanometers leaving that a maximum of 20% of the total PAR flux falling within a 250/400=⅝ths of the PAR bandwidth between 360 and 760 nm.
9. The method of claim 8 wherein the minimum 80% of the total PAR flux that is applied to the maximum total bandwidth is applied as a multiplicity of at least 8 narrowband artificial light sources each in a spectral range from 360 nanometers to 760 nanometers wavelength where each light source emits radiation flux within a bandwidth no wider than 10 nanometers; and wherein
more than 50% of the applied PAR is within a maximum of 20% of the bandwidth between 360 nm and 760 nm.
10. A method of applying photosynthetically active radiation ("PAR") effective for photosynthesis to plants, the method comprising:
applying PAR to plants in a multiplicity of four or more narrowband emissions between 360 and 760 nanometers wavelengths wherein these four or more narrowband emissions both (1) total in combination more than 80% of a total PAR flux applied, and (2) the more than 80% of the total PAR flux is applied within a maximum total bandwidth of only 150 nanometers wavelength or less; and wherein a remaining 250 nanometers bandwidth between 360 and 760 nanometers receives less than 20% of the total PAR flux applied.

11. The method according to claim 1 wherein the applying of PAR to plants includes the narrowband emmisions being more than 4 but 15 or less in number.

12. The energy-conserving method according to claim 8, wherein applying PAR to plants includes the narrowband emissions being more than 4 but 15 or less in number.

13. The method of applying photosynthetical ly active radiation ("PAR") effective for photosynthesis to plants according to claim 10, wherein applying PAR to plants includes the four or more narrowband emissions being 15 or less in number.

\* \* \* \* \*